United States Patent Office 3,661,844
Patented May 9, 1972

3,661,844
ORGANIC ACYL THIOACETAL AND THIOKETAL STABILIZERS FOR HALOGENATED RESINS
Christian H. Stapfer, Newtown, Pa., assignor to Cincinnati-Milacron Chemicals, Inc., Reading, Ohio
No Drawing. Filed Dec. 11, 1970, Ser. No. 97,310
Int. Cl. C08f 45/58
U.S. Cl. 260—45.95
10 Claims

ABSTRACT OF THE DISCLOSURE

Polyvinyl chloride formulations containing organic acyl thioacetals or thioketals of the formula

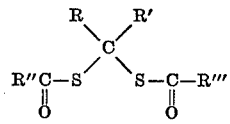

wherein R and R' may be hydrogen or may be joined in such a way to make a cyclo aliphatic group, R" and/or R''' are alkyl, aryl, aralkyl, alkaryl are stabilized against thermal degradation. Furthermore, R or R' can be a repetition of the thioacetal group, or be difunctional.

---

This invention relates to the stabilization of halogenated resins against degradation by heat and oxidation and to organic compounds suitable for such stabilization. More particularly this invention relates to polymerized halogen containing olefins stabilized with organic acyl thioacetals or thioketals.

Polyvinyl chloride compounds, when exposed to heat and air, undergo rapid degradation thus causing discoloration of the resin and deterioration of its physical properties. The tendency to decompose is usually reduced significantly by incorporating to the resin, various metallic or organo metallic compounds such as soaps of barium, cadmium, calcium, zinc, lead, and organotin compounds, such as mercaptides and carboxylates. The metallic stabilizers have many advantages ranging from insuring long term stability of the resin formulation, to imparting good clarity and physical properties of the finished product. However, in some cases, metallic compounds are unsuitable because of their high cost and/or toxicity, as well as poor early color developed in formulations stabilized therewith.

We have found that acyl thioacetals and thioketals of the formula

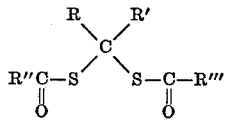

wherein R and R' may be hydrogen or may be joined in such a way to make a cyclo aliphatic group, R" and/or R''' are alkyl, aryl, aralkyl, alkaryl. Furthermore, R or R' can be a repetition of the thioacetal group, or be difunctional. These compounds have the merit of stabilizing halogenated resins, particularly polyvinyl chloride formulations, against excessive heat degradation when used as the sole stabilizer.

The volatility of thioacetals and thioketals can be reduced by increasing their molecular weight by means of condensation. In some cases the inclusion of hindered phenolic structures does improve their antioxidative properties and the presence of long alkyl chains improves their lubricating properties. This latter advantage is particularly evident when the acyl thioacetals or thioketals are used as sole stabilizers. Therefore, a well lubricated system is recommended for trouble free processing operations.

It is an object of the present invention to provide low cost organic stabilizers for halogenated resins.

It is a further object of the present invention to provide halogenated resins stabilized at a low cost.

R" and R''' can have up to 20 carbons and groups having up to 20 carbons are preferred. Suitable alkyl groups include methyl, ethyl, propyl, isopropyl, butyl, isobutyl, pentyl, hexyl, octyl, isooctyl, decyl, undecyl and dodecyl. Examples of other suitable groups include phenyl, benzyl, tolyl, xylyl, di-tert. butyl phenyl, di-tert. butyl benzyl and naphthyl. R and R' can be any of the groups listed above as suitable for R" and R'''. However, R and R' each generally contain 1 to 12 carbons and 1 to 8 carbons are preferred. In addition, R and R' may both be hydrogen or one of R and R' may have a thioacetal group or R and R', together, can be a polymethylene such as pentamethylene or the group can contain hydroxy substituted aryl or alkaryl such as hydroxyphenyl, hydroxybenzyl and 3,5 ditert. butyl-4-hydroxy phenyl. The following compounds are exemplary of suitable thioacetals and thioketal compounds.

(1) Benzaldehyde bis(benzolthioacetal)

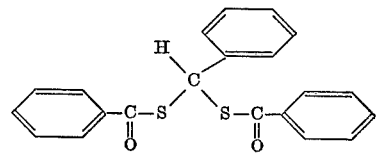

(2) 3,5 - ditert.butyl - 4 - hydroxybenzaldehyde - bis (benzoyl thiacetal)

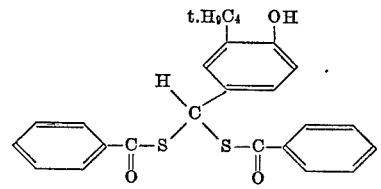

(3) Formaldehyde-bis (lauroyl thioacetal)

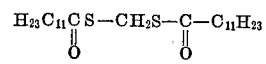

(4) Glyoxal-tetrakis (acetyl thioacetal)

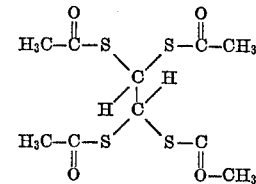

(5) 2-butanone-bis (benzoylthioketal)

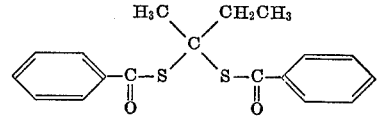

(6) Cyclohexanone bis (nonoylthioketal)

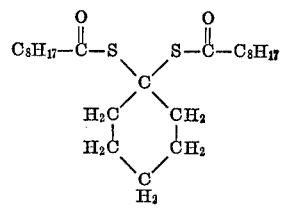

(7) 2-propanone bis (lauroylthioketal)

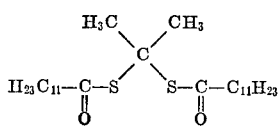

(8) Benzophenone bis (octadecoylthioketal)

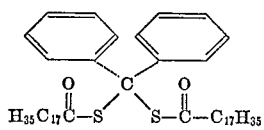

The thioacetals and thioketals of the present invention are prepared by the condensation of an aldehyde or ketone with an organic thiolacid and condensation can be catalyzed by dry hydrogen chloride or hydrochloric acid.

The thioacetals and thioketals are generally used in amounts of 0.05, when used as a co-stabilizer, to 5 weight percent based on the resin when used as a sole stabilizer. The preferred range, as a co-stabilizer, is 0.1 to 2 weight percent and, as a sole stabilizer, from 1 to 3 weight percent.

The stabilizers of the present invention are useful for halogen-containing olefin resin mixtures and copolymers thereof. Suitable polyvinyl halide resins include polyvinyl chloride, polyvinyl bromide and polyvinylidene chloride. Halogenated polyolefins are also suitable including chlorinated polyethylene and polypropylene. The mixtures may be prepared by blending a polyvinyl halide resin with other resins, such as ethylenically unsaturated polymers and copolymers including, polyvinyl acetate, polystyrene, polyacrylates and polymethacrylates, as well as acrylonitrile-butadiene-styrene copolymers. The copolymers which are suitable include copolymers of vinyl halides with other vinyl halides or ethylenically unsaturated monomers such as vinyl acetate, styrene and the like. The mixtures and copolymers should contain at least 50 weight percent of the halogen-containing olefins.

The following examples are illustrative of the present invention.

EXAMPLE I

A portion of a formulation consisting of 2000 g. of PVC-40, a general purpose polyvinyl chloride suspension resin manufactured by the Diamond-Shamrock Co., 50 g. of K-120N, an acrylic processing aid manufactured by the Rohm and Haas Company as lubricants 10 g. of Advawax 135 and 10 g. of Advawax 136, two ester waxes manufactured by Carlisle Chemical Works, Inc. and 40 g. of cyclohexanone-bis-lauroyl thioketal, was processed on a Plastograph torque rheometer, manufactured by the Brabender Corp. The stability curve was recorded and evaluated following standard procedures known to those versed in the art.

At 420° F. and 40 r.p.m., the formulation demonstrated a stability time of 9.1 min. at a minimum torque of 1830 metergrams. A similar formulation, containing no stabilizer, failed after less than three minutes at a considerably higher torque.

Another portion of the formulation described above was extruded in a 1" MPM laboratory extruder. At 30 r.p.m., 350° F. and 900 p.s.i. stock pressure, a clear pale amber rod having no sign of internal burning was extruded at the rate of 9 lbs. per hour. By comparison, an unstabilized system burns rapidly at the extremity of the screw and exhibits early degradation of the extrudate.

EXAMPLE II

Three mixtures of 100 parts of PVC-40, and 25 parts of dioctyl phthalate were stabilized with 2.0 parts of acetone-bis (benzoyl-thioketal) 2.0 parts of cyclohexanone-bis (benzoyl-thioketal), and 2.0 parts of benzaldehyde-bis (benzoyl-thioacetal) respectively. All three mixtures were processed for 5 min. on a two roll mill at 320° F. respectively and exposed in an air circulating oven for one hour at 370° F. At 10 min. intervals, samples of each mixture were removed from the oven and compared for relative discoloration. The stabilized formulation showed a first discoloration after 20 min. of exposure whereas an identical formulation containing no stabilizer degraded seriously after 10 min. of exposure and moreover displayed first discoloration while still on the mill.

EXAMPLE III

A rigid polyvinyl chloride formulation consisting of 100 parts of Geon 103EP, a general purpose polyvinyl chloride resin manufactured by the Monsanto Chemical Co. and 0.5 part of stearic acid was stabilized with 2.0 parts of glyoxal-tetrakis-acetyl thioacetal and processed following the procedure of Example II. The stabilized formulation could easily be milled for 5 min. at 370° F. and exposed to air at 370° F. for 15 min. before strong discoloration took place. In comparison, an identical formulation containing no stabilizer could not be milled, since it stuck to the rolls after less than one minute of processing.

What is claimed is:

1. A composition comprising a chlorine or bromine containing resin and 0.05 to 5 weight percent of a compound corresponding to the formula

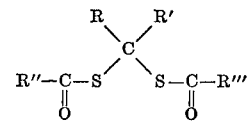

wherein R and R' are selected from the group consisting of hydrogen, alkyl, aryl, arakyl, alkaryl, polymethylene when taken together, hydroxy substituted aryl or alkaryl,

and when R' is hydrogen, R is

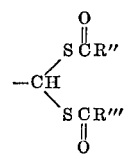

and R" and R'" are selected from the group consisting of alkyl, aryl, alkaryl, and aralkyl having 1 to 20 carbons.

2. A composition according to claim 1 wherein said resin is polyvinyl chloride.

3. A composition according to claim 2 containing 1 to 3 percent formaldehyde bis (lauroyl thioacetal).

4. A composition according to claim 2 containing 1 to 3 percent 3,5-ditert.butyl-4-hydroxybenzaldehyde-bis (benzoyl thioacetal).

5. The composition of claim 2 wherein R is hydrogen, R' is selected from the group consisting of alkyl, aryl, alkaryl, aralkyl having up to 8 carbons and hydroxy substituted aryl or alkaryl having 6 to 8 carbons and R" and R'" have 1 to 12 carbons.

6. The composition of claim 2 wherein R and R' form pentamethylene and R" and R'" have 1 to 12 carbons.

7. The composition of claim 2 wherein R and R' are alkyl having 1 to 8 carbons and R" and R'" have 1 to 12 carbons.

8. The composition of claim 2 wherein R is hydrogen, R' is

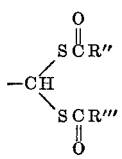

and R" and R''' have 1 to 12 carbons.

9. The composition of claim 2 wherein the halogen-containing polymerized resin is polyvinyl chloride and the compound is present in an amount of 1 to 5 weight percent and is selected from the group consisting of benzaldehyde bis (benzoyl thioacetal), 3,5-ditert.-butyl-4-hydroxybenzaldehyde bis (benzoylthioacetal), formaldehyde bis (lauroyl thioacetal), glyoxal tetrakis (acetyl thioacetal), 2-butanone bis (benzoylthioketal), cyclohexanone bis (nonoylthiaketal), cyclohexanone bis (lauroyl thioketal), cyclohexanone bis (benzoylthioketal), 2-propanone bis (lauroylthioketal) and benzophenone bis (octadecoylthioketal).

10. The composition of claim 9 wherein the amount of said compound is 1 to 3 weight percent.

UNITED STATES PATENTS
References Cited

| | | | |
|---|---|---|---|
| 3,544,510 | 12/1970 | Stapfer | 260—45.75 |
| 2,626,279 | 1/1953 | Crouch et al. | 260—455 |
| 2,706,202 | 4/1955 | Bavley et al. | 260—455 |
| 3,137,615 | 6/1964 | Ichikawa et al. | 260—455 |
| 3,090,798 | 5/1963 | Martin | 260—455 |
| 3,004,949 | 10/1961 | Chevassus | 260—45.75 |
| 3,461,091 | 8/1969 | Stamm | 260—23 |

DONALD E. CZAJA, Primary Examiner

R. A. WHITE, Assistant Examiner

U.S. Cl. X.R.

260—45.7 S, 260—899